(12) United States Patent
Bang et al.

(10) Patent No.: US 12,604,160 B2
(45) Date of Patent: Apr. 14, 2026

(54) DEVICE FOR TRANSMITTING PUSH-TO-TALK MESSAGE

(71) Applicant: UNIONPLACE CO., LTD., Seoul (KR)

(72) Inventors: Seongcheol Bang, Seoul (KR); Hyojung Kim, Seoul (KR); Youngkyu Shin, Seoul (KR); Seunggyeom Kim, Seoul (KR); Jonguk Jun, Seoul (KR)

(73) Assignee: UNIONPLACE CO., LTD., Seoul (KR)

( * ) Notice: Subject to any disclaimer, the term of this patent is extended or adjusted under 35 U.S.C. 154(b) by 434 days.

(21) Appl. No.: 18/201,477

(22) Filed: May 24, 2023

(65) Prior Publication Data

US 2024/0098460 A1 Mar. 21, 2024

(30) Foreign Application Priority Data

Sep. 19, 2022 (KR) ......................... 10-2022-0117825

(51) Int. Cl.
*H04W 4/00* (2018.01)
*H04L 43/10* (2022.01)
(Continued)

(52) U.S. Cl.
CPC ............... *H04W 4/10* (2013.01); *H04L 43/10* (2013.01); *H04W 4/12* (2013.01)

(58) Field of Classification Search
CPC .......... H04W 24/10; H04W 4/12; H04L 43/10
See application file for complete search history.

(56) References Cited

U.S. PATENT DOCUMENTS 7,983,199 B1 * 7/2011 Nguyen .............. H04L 65/4061
455/412.2
2002/0150091 A1 * 10/2002 Lopponen ........... H04L 65/1104
370/389
(Continued)

FOREIGN PATENT DOCUMENTS

KR 10-1336877 B1 11/2013
KR 10-2019-0019155 A 2/2019
(Continued)

OTHER PUBLICATIONS

Office Action issued on Nov. 29, 2022, issued to Korean Application No.

*Primary Examiner* — Elisabeth Benoit Magloire
(74) *Attorney, Agent, or Firm* — Stein IP, LLC

(57) ABSTRACT

There is provided a device for transmitting a push-to-talk (PTT) message. The device includes a communication interface, and an operation processor that transmits a first segment group of the PTT message among segments of the PTT message to first to n-th PTT devices through the communication interface; transmits a heartbeat signal to the first to n-th PTT devices through the communication interface; receives an i-th response signal to the heartbeat signal from an i-th PTT device through the communication interface; allocates, based on the i-th response signal, the i-th PTT device to a first group to which a second segment group of the PTT message is transmitted without any conversion or a second group to which data obtained by converting the second segment group is transmitted; and transmits the second segment group to the first group and the data to the second group through the communication interface.

16 Claims, 6 Drawing Sheets

OPERATION PROCESSOR ~ 150

P110 TRANSMIT FIRST SEGMENT GROUP OF PTT MESSAGE AMONG MULTIPLE SEGMENTS OF PTT MESSAGE TO EACH OF FIRST PTT DEVICE TO n-TH PTT DEVICE

P120 TRANSMIT HEARTBEAT SIGNAL TO EACH OF FIRST PTT DEVICE TO n-TH PTT DEVICE

P130 RECEIVE i-TH RESPONSE SIGNAL TO HEARTBEAT SIGNAL FROM i-TH PTT DEVICE

P140 ALLOCATE, BASED ON i-TH RESPONSE SIGNAL, i-TH PTT DEVICE TO EITHER FIRST GROUP OR SECOND GROUP

P150 TRANSMIT SECOND SEGMENT GROUP OF PTT MESSAGE TO FIRST GROUP AND TRANSMIT DATA OBTAINED BY CONVERTING SECOND SEGMENT GROUP OF PTT MESSAGE TO SECOND GROUP

(51) Int. Cl.
    *H04W 4/10*        (2009.01)
    *H04W 4/12*        (2009.01)

(56)             References Cited

U.S. PATENT DOCUMENTS

| | | | |
|---|---|---|---|
| 2008/0084878 A1* | 4/2008 | Akbar | H04L 12/1886 |
| | | | 370/390 |
| 2010/0246467 A1* | 9/2010 | Song | H04W 60/04 |
| | | | 370/312 |
| 2010/0255839 A1* | 10/2010 | Song | H04W 72/30 |
| | | | 455/435.1 |
| 2010/0322131 A1* | 12/2010 | Song | H04W 72/30 |
| | | | 370/312 |
| 2011/0044226 A1* | 2/2011 | Song | H04W 72/30 |
| | | | 370/312 |
| 2019/0140908 A1 | 5/2019 | Ma | |
| 2019/0274112 A1* | 9/2019 | Kleinbeck | H04B 17/20 |
| 2020/0366658 A1* | 11/2020 | Bang | H04L 9/14 |
| 2021/0067988 A1* | 3/2021 | Daneshvar | H04W 16/14 |
| 2022/0116748 A1* | 4/2022 | Bang | H04L 65/4038 |

FOREIGN PATENT DOCUMENTS

| | | |
|---|---|---|
| KR | 10-2020-0052172 A | 5/2020 |
| KR | 10-2138484 B1 | 7/2020 |
| KR | 10-2212205 B1 | 1/2021 |

* cited by examiner

FIG. 3

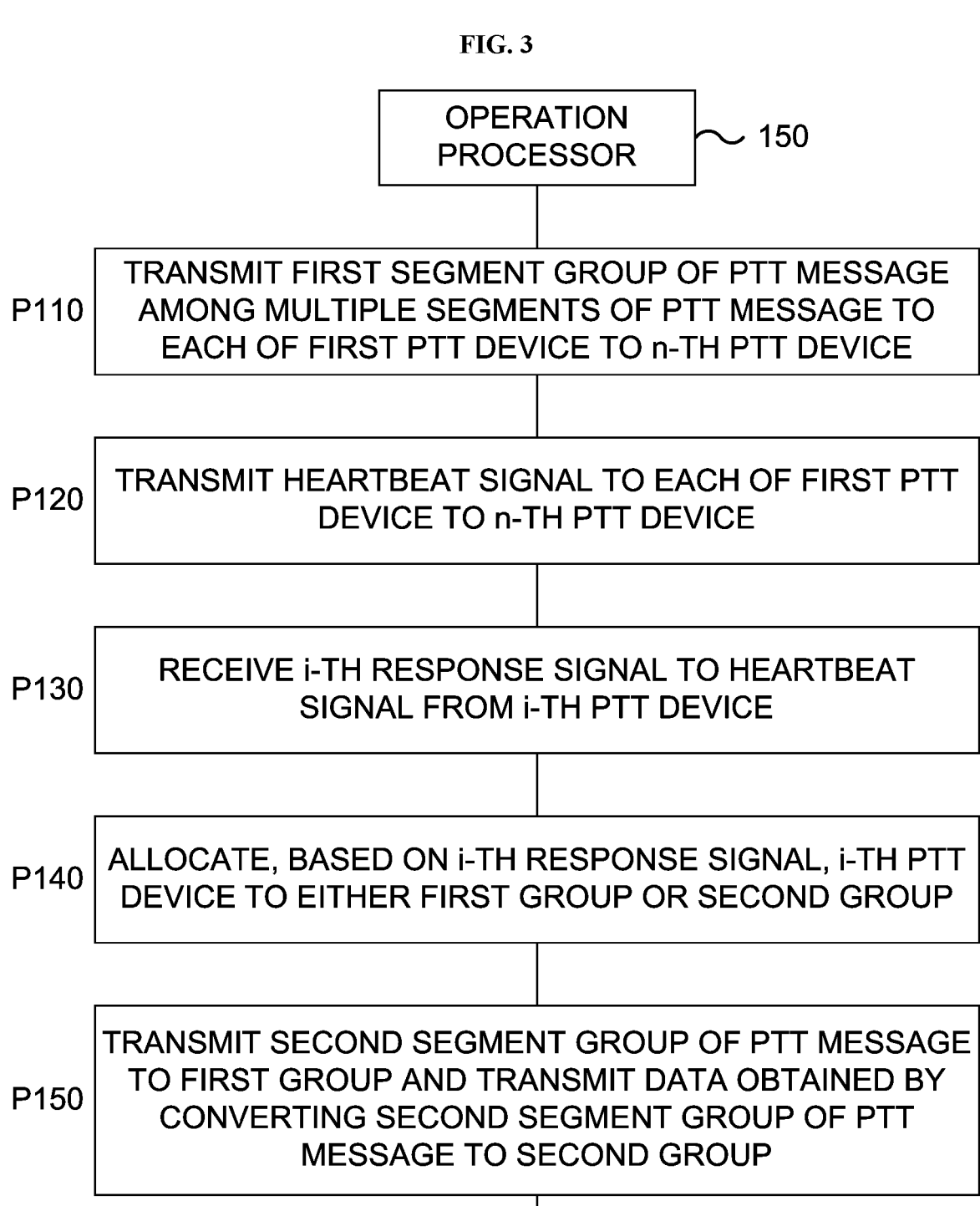

OPERATION
PROCESSOR ～ 150

P110 | TRANSMIT FIRST SEGMENT GROUP OF PTT MESSAGE AMONG MULTIPLE SEGMENTS OF PTT MESSAGE TO EACH OF FIRST PTT DEVICE TO n-TH PTT DEVICE

P120 | TRANSMIT HEARTBEAT SIGNAL TO EACH OF FIRST PTT DEVICE TO n-TH PTT DEVICE

P130 | RECEIVE i-TH RESPONSE SIGNAL TO HEARTBEAT SIGNAL FROM i-TH PTT DEVICE

P140 | ALLOCATE, BASED ON i-TH RESPONSE SIGNAL, i-TH PTT DEVICE TO EITHER FIRST GROUP OR SECOND GROUP

P150 | TRANSMIT SECOND SEGMENT GROUP OF PTT MESSAGE TO FIRST GROUP AND TRANSMIT DATA OBTAINED BY CONVERTING SECOND SEGMENT GROUP OF PTT MESSAGE TO SECOND GROUP

OPERATION
PROCESSOR                        ~ 150

P160    DESIGNATE FIRST PTT DEVICE TO n-TH PTT DEVICE
AMONG MULTIPLE PTT DEVICES

P170    READ IDENTIFICATION INFORMATION OF EACH OF FIRST
PTT DEVICE TO n-TH PTT DEVICE AMONG MULTIPLE PTT
DEVICE

OPERATION
PROCESSOR                        ~ 150

P180    CONVERT SEGMENTS OF SECOND SEGMENT GROUP OF
PTT MESSAGE INTO DATA

FIG. 6A

| PTT MESSAGE S#1 | PTT MESSAGE S#2 | PTT MESSAGE S#3 | PTT MESSAGE S#4 | PTT MESSAGE S#5 | ・・・ |
|---|---|---|---|---|---|
| VIDEO SIGNAL | VIDEO SIGNAL | VIDEO SIGNAL | VIDEO SIGNAL | VIDEO SIGNAL | ・・・ |
| AUDIO SIGNAL | AUDIO SIGNAL | AUDIO SIGNAL | AUDIO SIGNAL | AUDIO SIGNAL | ・・・ |

FIG. 6B

| SEQUENCE NUMBER | TIMESTAMP | SYNCHRONIZATION INFORMATION | SEQUENCE IDENTIFICATION INFORMATION FOR PTT MESSAGE |
|---|---|---|---|

FIG. 6C

| SEQUENCE NUMBER | TIMESTAMP | IDENTIFICATION INFORMATION OF i-TH PTT DEVICE | SEQUENCE IDENTIFICATION INFORMATION FOR PTT MESSAGE |
|---|---|---|---|

FIG. 8

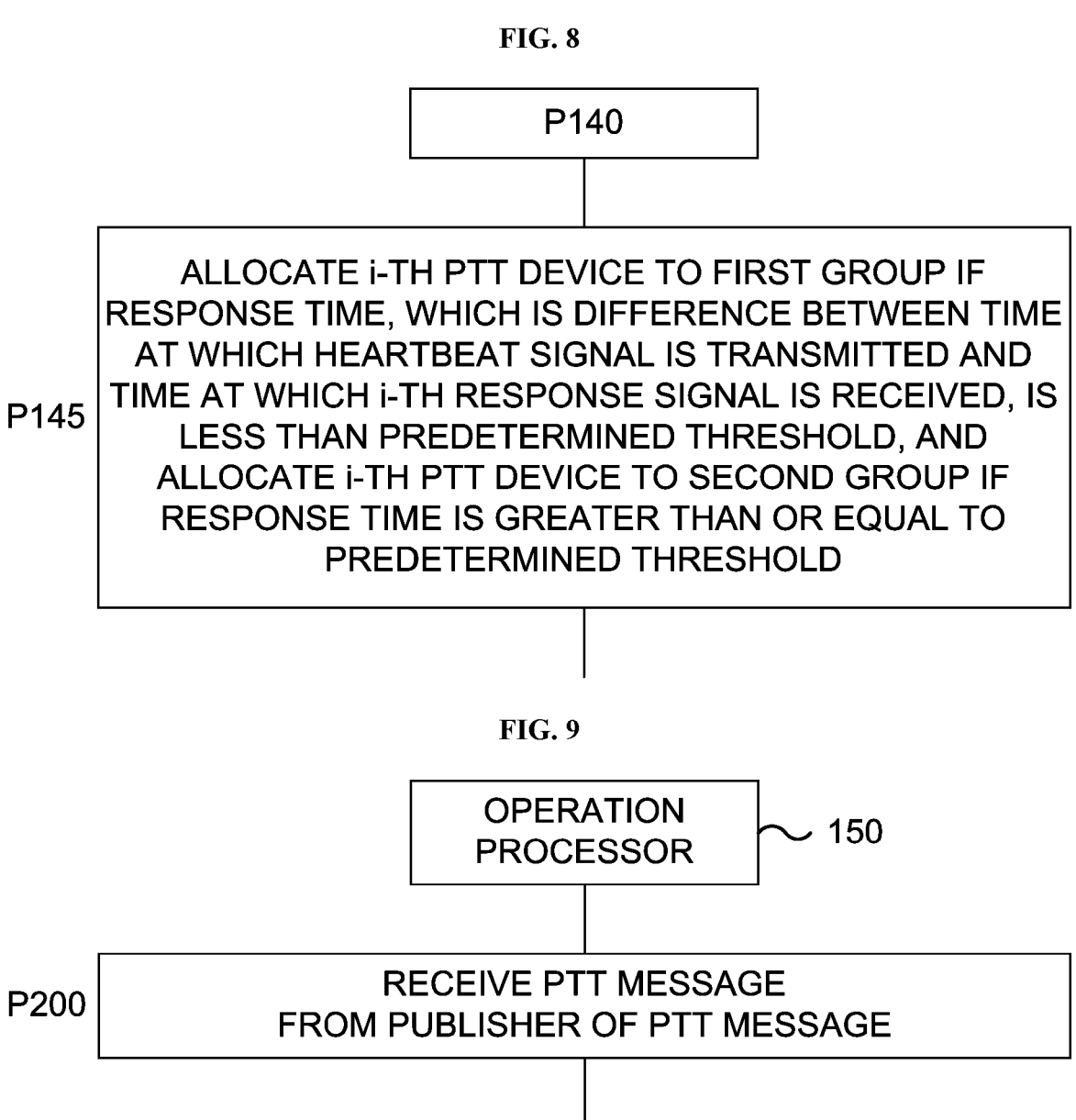

P140

P145

ALLOCATE i-TH PTT DEVICE TO FIRST GROUP IF RESPONSE TIME, WHICH IS DIFFERENCE BETWEEN TIME AT WHICH HEARTBEAT SIGNAL IS TRANSMITTED AND TIME AT WHICH i-TH RESPONSE SIGNAL IS RECEIVED, IS LESS THAN PREDETERMINED THRESHOLD, AND ALLOCATE i-TH PTT DEVICE TO SECOND GROUP IF RESPONSE TIME IS GREATER THAN OR EQUAL TO PREDETERMINED THRESHOLD

FIG. 9

OPERATION PROCESSOR ~ 150

P200

RECEIVE PTT MESSAGE FROM PUBLISHER OF PTT MESSAGE

DEVICE FOR TRANSMITTING PUSH-TO-TALK MESSAGE

CROSS-REFERENCE TO RELATED PATENT APPLICATION

This non-provisional U.S. patent application is based on and claims priority under 35 U.S.C. § 119 of Korean Patent Application No. 10-2022-0117825 filed on Sep. 19, 2022, in the Korean Intellectual Property Office, the entire contents of which are hereby incorporated by reference.

BACKGROUND

1. Field

The present disclosure relates to a device for transmitting push-to-talk messages.

The technique disclosed herein was supported by Institute for Information & communications Technology Promotion (IITP) grant funded by the Korea government (Ministry of Science and ICT (MSIT)) (Project name: "LTE-R 5G Integrated-control Container on Next Generation Railway Communication," Project No.: 2021-0-00477-003, NIST No: 1711193984(2023)).

2. Related Art

A push-to-talk service (hereinafter, also referred to as "PTT") is a communication service provided in a "press and speak" manner. A push-to-talk device (hereinafter, also referred to as a "PTT device") includes an interface for acquiring a floor (e.g., a talk burst authority or a media burst authority). For example, the interface for acquiring the floor may commonly referred to as a "button" and may be configured as at least one of a physical input interface or a graphical user interface displayed on a screen. Among a plurality of PTT devices (e.g., a first PTT device, a second PTT device, and a third PTT device), a PPT device that has acquired the floor may transmit a message to other PTT devices. The floor is not granted to two or more PTT devices at the same time. That is, the floor is granted to only one PTT device at any given time. For example, among the plurality of PTT devices including the first PTT device, the second PTT device, and the third PTT device, when the first PTT device acquires the floor, the first PTT device is only allowed to transmit a message while the second PTT device and the third PTT device are only allowed to receive the message. Further, when the second PTT device acquires the floor, the second PTT device is only allowed to transmit a message, and the first PTT device and the third PTT device are only allowed to receive the message. The PTT service may be used for monitoring and controlling communications in various sites including railways, roads, power plants, transmission and distribution facilities, production facilities and business facilities.

The PTT service may be implemented by performing, for example, communications using a plurality of network sessions in a unicast manner or performing communications using a single network session in a multicast manner. In other words, the first PTT device transmits a message to a server (hereinafter, referred to as a "PTT server") providing the PTT service, and the PTT server transmits the message to the second PTT device and the third PTT device in the unicast manner or the multicast manner.

The PTT service may be provided based on the quality of communication service on the network. For example, according to a technique such as two way active measurement protocol (TWAMP), a quality measurement server separately transmits a quality measurement signal to each of the plurality of PTT devices, receives a response signal to the quality measurement signal separately from each of the plurality of PTT devices, and measures the quality of communication service based on the received response signal. The response signal includes, for example, the number of packets transmitted by the quality measurement server to the client (i.e., each of the plurality of PTT devices), the number of packets received by the quality measurement server from the client, and the number of lost packets (i.e., the difference between the number of packets transmitted to the client and the number of packets received from the client), the number of packets with duplicate sequence numbers, the number of packets with reversed sequence numbers (i.e., the received order is changed), a network delay (i.e., the time period from transmission to reception of a packet), and jitter (i.e., the cumulative average of the delay from transmission to reception of a packet). Thus, as the number of PTT devices included in the PTT network increases, the time required to measure the quality of the communication service also increases. The quality measurement server is preferably operated separately from the PTT server.

After the quality measurement server measures the quality of the communication service on the network, the PTT server may provide PTT services based on the measured quality of the communication service. The quality of the communication service may be monitored and evaluated in a non-real time manner or at predetermined measurement intervals. Therefore, the quality of the communication service is measured and determined prior to providing the PTT services. Accordingly, if the quality of the communication service changes while the PTT services are being provided by the PTT server, the PTT services being provided based on the quality that is measured and determined prior to providing the PTT services may not be suitable for the changed quality.

Further, if the PTT devices have different processing power from each other (e.g., different computing capabilities and different communication capabilities), the PTT server provides PTT services with a specified quality that is determined based on the PTT device having the lowest processing power among the plurality of PTT devices. Thus, the PTT services having the quality, which is determined based on the PTT device having the lowest processing power, are provided by the PTT server not only to the PTT device having the lowest processing power, but also to other PTT devices with the higher processing power among the plurality of PTT devices.

In addition, since the PTT server is used to provide the PTT services, the PTT services cannot be provided when the PTT server malfunctions or stops operating.

RELATED ART

Patent Document

Patent Document 1: Korean Registered Patent No. 10-1336877

Patent Document 2: Korean Patent Application Publication No. 10-2020-0052172

Patent Document 3: Korean Patent Application Publication No. 10-2019-0019155

SUMMARY

It is an object of the technique of the present disclosure to provide a device for transmitting a push-to-talk (PTT)

message, the device being capable of checking, by using the heartbeat signal, the status of each of the plurality of PTT devices in real time without using a signal for quality measurement and a quality measurement server; minimizing, by collectively transmitting the heartbeat signal to the plurality of PTT devices, the time required to check the status of each of the plurality of PTT devices; providing a PTT service suitable for each of the plurality of PTT devices based on the measured status of each of the plurality of PTT devices even during transmission of the PTT message; providing the PTT service to each of the plurality of PTT devices even without using the PTT server when identification information of each of the plurality of PTT devices is stored therein.

In view of the above, according to one aspect of the technique of the present disclosure, there is provided a device for transmitting a push-to-talk (PTT) message, the device including: a communication interface; and an operation processor configured to: (a) transmit a first segment group of the PTT message among multiple segments of the PTT message to a first PTT device to an n-th PTT device (where "n" is a natural number equal to or greater than 2) through the communication interface; (b) transmit a heartbeat signal to the first PTT device to the n-th PTT device through the communication interface; (c) receive an i-th response signal to the heartbeat signal from an i-th PTT device (where "i" is a natural number from 1 to n) through the communication interface; (d) allocate, based on the i-th response signal, the i-th PTT device to either one of: a first group to which a second segment group of the PTT message among the multiple segments of the PTT message is transmitted without any conversion; and a second group to which data obtained by converting all segments of the second segment group of the PTT message is transmitted; and (e) transmit the second segment group of the PTT message to the first group through the communication interface and transmit the data to the second group through the communication interface.

According to the technique of the present disclosure, it is possible to check, by using the heartbeat signal, the status of each of the plurality of PTT devices in real time without using a signal for quality measurement and a quality measurement server; the time required to check the status of each of the plurality of PTT devices can be minimized by collectively transmitting the heartbeat signal to the plurality of PTT devices; and the PTT service suitable for each of the plurality of PTT devices can be provided based on the measured status of each of the plurality of PTT devices even during the transmission of the PTT message. In addition, in the case where the identification information of each of the plurality of PTT devices is stored in the device for transmitting the PTT message, the device for transmitting the PTT message can provide the PTT service to each of the plurality of PTT devices even without using the PTT server.

BRIEF DESCRIPTION OF THE DRAWINGS

FIGS. 3 to 5 are diagrams illustrating an example of the sequence of operations performed by an operation processor of the device for transmitting the PTT message according to the first embodiment.

FIGS. 6A to 6C are diagrams respectively illustrating exemplary structures of a PTT message, a heartbeat signal, and an i-th response signal in the device for transmitting the PTT message according to the first embodiment.

FIG. 8 is a diagram specifically illustrating the operation of allocating an i-th PTT device to a group, which is performed by the operation processor of the device for transmitting the PTT message according to the first embodiment.

FIG. 9 is a diagram illustrating an example of the sequence of operations performed by an operation processor of a device for transmitting a PTT message according to a second embodiment.

DETAILED DESCRIPTION

Figure 1:
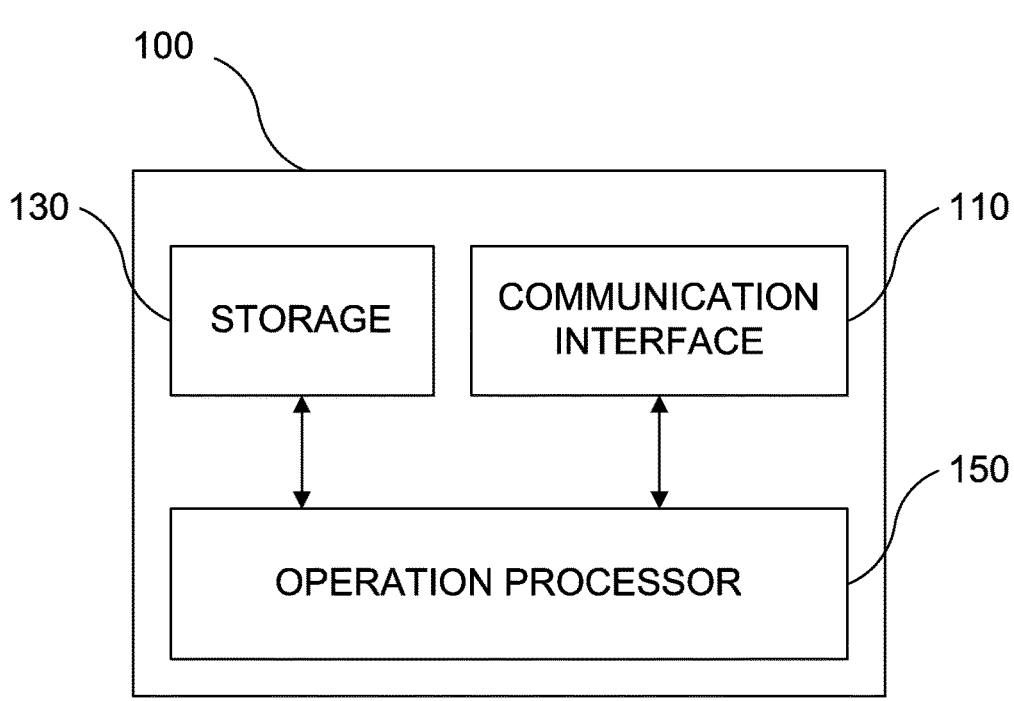
FIG. 1 is a diagram illustrating an example of a configuration of a device for transmitting a push-to-talk (PTT) message according to a first embodiment of the technique of the present disclosure.

Hereinafter, one or more embodiments (also simply referred to as "embodiments") of a device for transmitting a push-to-talk (PTT) message according to the technique of the present disclosure will be described mainly with reference to the drawings. Meanwhile, in the drawings for describing the embodiments of the technique of the present disclosure, for the sake of convenience of description, only a part of the practical configurations may be illustrated or the practical configurations may be illustrated while a part of the practical configurations is omitted or changed. Further, relative dimensions and proportions of parts therein may be exaggerated or reduced in size.

First Embodiment

Figure 2:
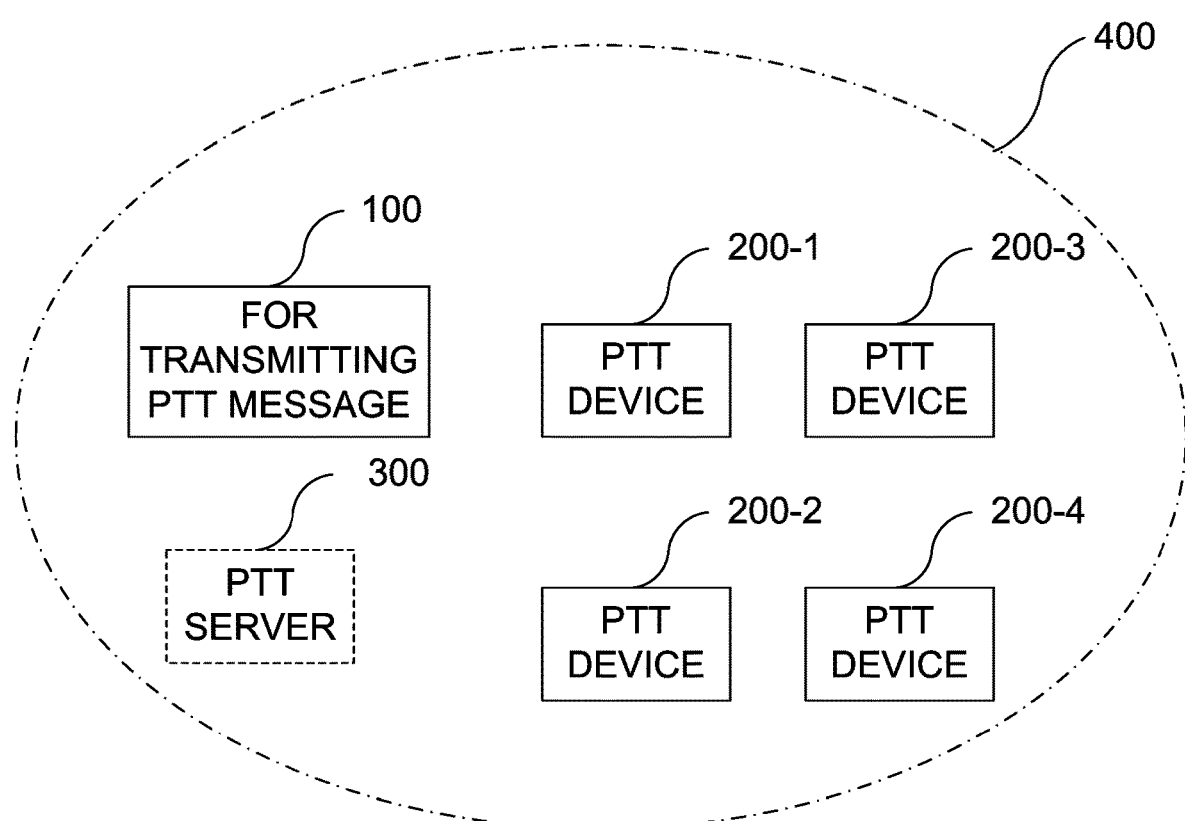
FIG. 2 is a diagram illustrating an example of an environment in which the device for transmitting the PTT message according to the first embodiment is used.

FIG. 1 is a diagram illustrating an example of a configuration of a device 100 for transmitting a push-to-talk (PTT) message according to a first embodiment of the technique of the present disclosure. FIG. 2 is a diagram illustrating an example of an environment in which the device 100 according to the first embodiment of the technique of the present disclosure is used.

Referring to FIG. 1, the device 100 of the first embodiment includes a communication interface 110 and an operation processor 150. As shown in FIG. 1, the device 100 may further include a storage 130.

Referring to FIG. 2, the device 100 is located in a network group 400. Further, a plurality of PTT devices, for example, a PTT device 200-1, a PTT device 200-2, a PTT device 200-3, and a PTT device 200-4, are located in the network group 400. Although the case having the four PTT devices 200-1 to 200-4 is described as an example in the first embodiment, the number of PTT devices that can be located in the network group 400 is not limited thereto. For example, 10,000 PTT devices may be located in the network group 400. Each or all of the plurality of PTT devices such as the PTT devices 200-1 to 200-4 may have the same configuration as the device 100 of the first embodiment.

Referring to FIG. 2, a server that provides a PTT service (hereinafter, referred to as "PTT server") 300 may be also located in the network group 400. The PTT server 300 receives a PTT message transmitted from the device 100 and transmits the PTT message to the plurality of PTT devices.

The communication interface 110 is configured to communicate with the plurality of PTT devices included in the network group 400. For example, the communication interface 110 is configured to perform communication with the PTT device 200-1, the PTT device 200-2, the PTT device 200-3, and the PTT device 200-4. Preferably, the communication interface 110 may be configured to perform communication with the plurality of PTT devices included in the network group 400 without using the PTT server 300. Alternatively, the communication interface 110 may be configured to perform communication with the plurality of PTT devices either using the PTT server 300 or without using the PTT server 300. The communication interface 110 may perform communication with the plurality of PTT devices, for example, in a unicast manner or a multicast manner. The communication interface 110 may be implemented using a semiconductor device such as a semiconductor chip used on communications.

As described above, the device 100 may further include the storage 130. The storage 130 is configured to store identification information of each of the plurality of PTT devices included in the network group 400. For example, the storage 130 stores identification information of each of the plurality of PTT devices that includes the PTT device 200-1, the PTT device 200-2, the PTT device 200-3, and the PTT device 200-4. The storage 130 may further store identification information of the device 100. The storage 130 may be implemented using a semiconductor device such as a semiconductor memory.

By storing the identification information of each of the plurality of PTT devices in the storage 130, the device 100 is allowed to communicate with the plurality of PTT devices even without using the PTT server 300. In other words, even if the PTT server 300 malfunctions or stops operating, the device 100 is still allowed to communicate with the plurality of PTT devices. The identification information of each of the plurality of PTT devices may include, for example, information such as unique identification information and a network address of the corresponding PTT device.

The operation processor 150 is electrically connected to the communication interface 110. In the case that the device 100 includes the storage 130, the operation processor 150 is electrically connected to the storage 130. The operation processor 150 is configured to perform sequence of operations to be described later according to the technique of the present disclosure. The details of the sequence of operations performed by the operation processor 150 will be described later. The operation processor 150 may be implemented by, for example, a semiconductor device (i.e., a processor) such as a central processing unit (CPU). More specifically, the operation processor 150 may include one or more processors (not shown). The one or more processors are configured to respectively perform at least some of the operations to be described later that are performed by the operation processor 150.

It is preferable that the configuration of the device 100 is substantially the same as that of each of the plurality of PTT devices. That is, for example, when the PTT device 200-1 serves to transmit a new PTT message, each of the plurality of PTT devices may operate as the device 100. Similarly, when the device 100 serves to receive the new PTT message, the device 100 may operate as the PTT device.

Figures 4, 5:
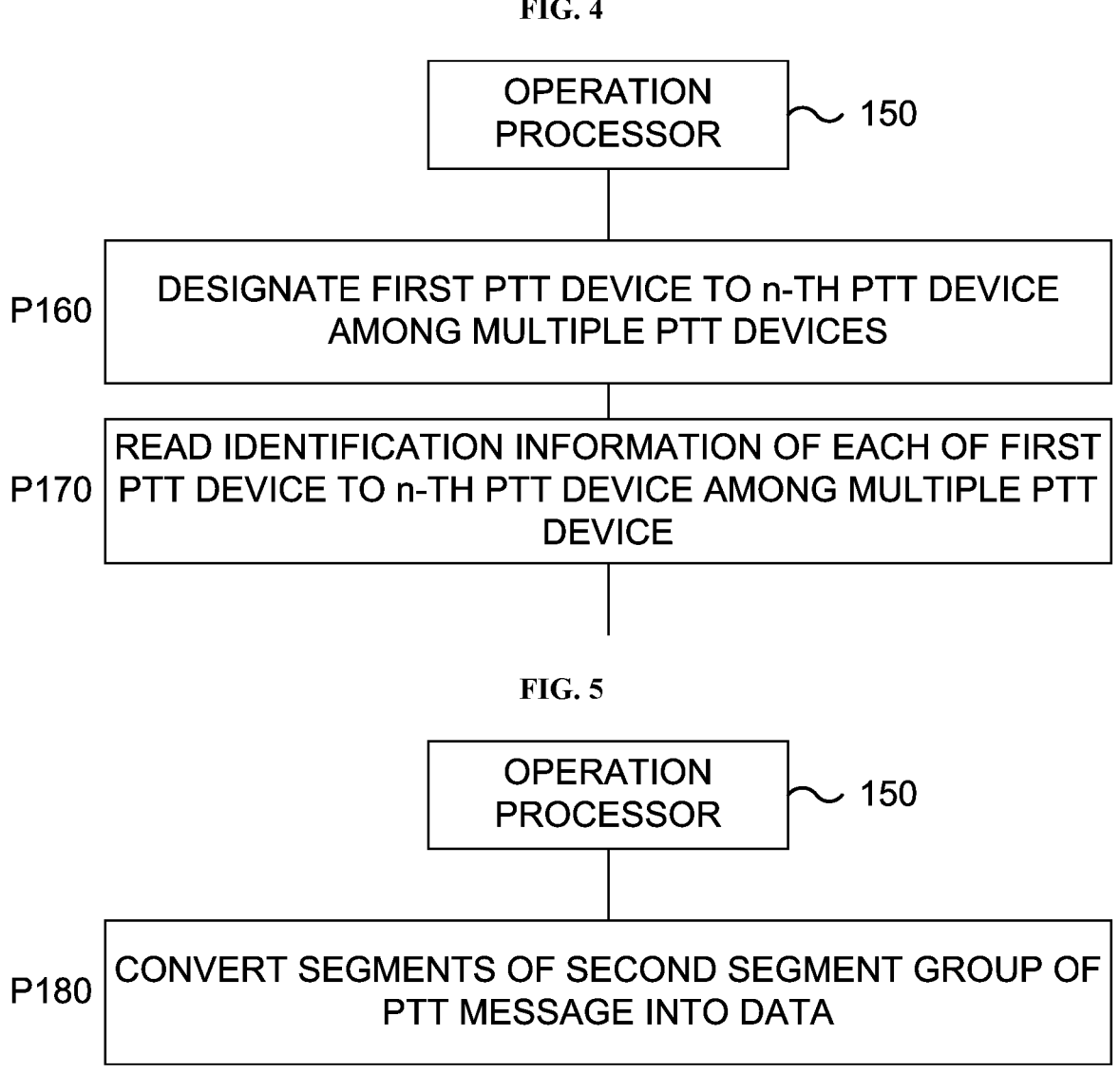
Figure 7:
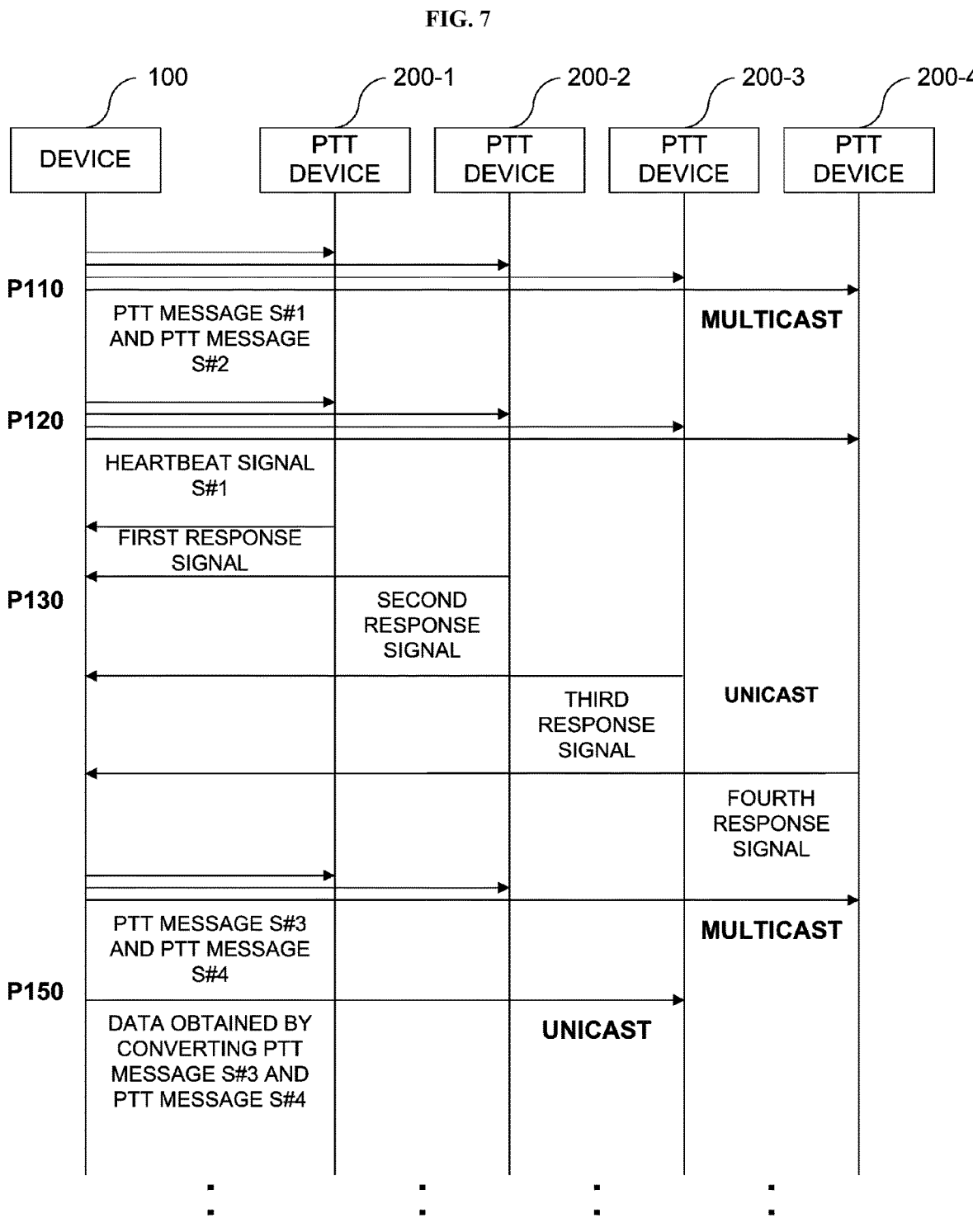
FIG. 7 is a diagram specifically illustrating the operations performed by the operation processor of the device for transmitting the PTT message according to the first embodiment.

FIGS. 3 to 5 are diagrams illustrating an example of the sequence of operations performed by the operation processor 150 of the device 100 for transmitting a PTT message according to the first embodiment. FIGS. 6A to 6C are diagrams respectively illustrating exemplary structures of a PTT message, a heartbeat signal, and an i-th response signal in the device 100 for transmitting the PTT message according to the first embodiment. Further, FIG. 7 is a diagram specifically illustrating some of the operations performed by the operation processor 150 of the device 100 for transmitting the PTT message according to the first embodiment.

First, in step P110, the operation processor 150 transmits a part of the PTT message (a first segment group of the PTT message among a plurality of segments of the PTT message) to each of a first PTT device to an n-th PTT device (where "n" is a natural number equal to or greater than 2) through the communication interface 110. For example, when "n" is 4, the operation processor 150 transmits a part (the first segment group of the PTT message among the plurality of segments of the PTT message) of the PTT message to each of the PTT device 200-1 (corresponding to the first PTT device), the PTT device 200-2 (corresponding to the second PTT device), the PTT device 200-3 (corresponding to the third PTT device), and the PTT device 200-4 (corresponding to the fourth PTT device) through the communication interface 110. Hereinafter, the operations performed by the operation processor 150 will be described in the case where "n" is 4.

Referring to FIG. 6A, the PTT message includes a plurality of segments. For example, the plurality of segments of the PTT message may include a PTT message S #1, a PTT message S #2, a PTT message S #3, a PTT message S #4, a PTT message S #5 and so on.

Further, the PTT message may include a video signal at a first bit rate and an audio signal at a second bit rate.

For example, the first bit rate of the video signal may be one of a bit rate for video telephony (e.g., 16 kbps), a bit rate for video conferencing systems (e.g., a range of 128 kbps to 384 kbps), a bit rate for MPEG-2 DVD (e.g., 9,200 kbps), a bit rate for HD video (e.g., a range of 13,000 kbps to 19,000 kbps), and a bit rate for Blu-ray (50,000 kbps).

Further, for example, the second bit rate of the audio signal may be one of a bit rate for AM quality (e.g., 32 kbps), a bit rate for FM quality (e.g., 96 kbps), a bit rate for digital audio broadcast (DAB) quality (e.g., 192 kbps), a bit rate for CD quality (e.g., a range of 224 kbps to 320 kbps), a bit rate for AC3 quality (e.g., a range of 96 kbps to 640 kbps), a bit rate for DTS quality (e.g., 1,536 kbps), a bit rate for DTS-HD quality (e.g., 6,000 kbps), a bit rate for Dolby True HD quality (e.g., 18,000 kbps), and a bit rate for DTS-HD Master quality (e.g., 24,500 kbps).

Referring to FIG. 6A, each of the plurality of segments of the PTT message may include the video signal and the audio signal.

For example, referring to FIG. 7, in step P110, the first segment group of the PTT message (e.g., the PTT message S #1 and the PTT message S #2) is transmitted to each of the PTT device 200-1, the PTT device 200-2, the PTT device 200-3, and the PTT device 200-4.

The first segment group of the PTT message (e.g., the PTT message S #1 and the PTT message S #2) may be transmitted to the PTT device 200-1, the PTT device 200-2, the PTT device 200-3, and the PTT device 200-4 in a multicast manner or a unicast manner. Preferably, the first segment group of the PTT message (e.g., the PTT message S #1 and the PTT message S #2) may be transmitted to the PTT device 200-1, the PTT device 200-2, the PTT device 200-3, and the PTT device 200-4 in the multicast manner.

Next, in step P120, the operation processor 150 transmits the heartbeat signal (e.g., the heartbeat signal S #1) to each of the PTT device 200-1, the PTT device 200-2, the PTT device 200-3, and the PTT device 200-4 through the communication interface 110.

Referring to FIG. 6B, the heartbeat signal may include a sequence number, a timestamp, and synchronization information. The heartbeat signal may further include identification information of each segment of the first segment group of the PTT message.

For example, the sequence number is a serial number. For example, in the case where the serial number is "1," the sequence number of the heartbeat signal may be set to "S #1" as shown in FIG. 7.

The timestamp of the heartbeat signal is, for example, a network time protocol (NTP) timestamp.

The synchronization information of the heartbeat signal is information that indicates a synchronization method (for example, an internal NTP or an external NTP).

The identification information in the heartbeat signal is the identification information of each segment of the first segment group of the PTT message described above. For example, when the PTT message S #1 and the PTT message S #2 are transmitted in step P110, the identification information of the first segment group of the PTT message may be set to "PTT S #1" and "PTT S #2."

The heartbeat signal may be transmitted to the PTT device 200-1, the PTT device 200-2, the PTT device 200-3, and the PTT device 200-4 in the multicast manner or the unicast manner. Preferably, the heartbeat signal is transmitted to the PTT device 200-1, the PTT device 200-2, the PTT device 200-3, and the PTT device 200-4 in the multicast manner.

Next, in step S130, the operation processor 150 receives the i-th response signal to the heartbeat signal, which is transmitted in step P120 from an i-th PTT device (where "i" is a natural number from 1 to n), through the communication interface 110. That is, the operation processor 150 receives a first response signal, a second response signal, a third response signal, and a fourth response signal from the PTT device 200-1, the PTT device 200-2, the PTT device 200-3, and the PTT device 200-4, respectively.

The i-th response signal may include a sequence number and identification information of the i-th PTT device. Further, the i-th response signal may include whether or not information is received for each segment of the first segment group of the PTT message.

Specifically, referring to FIG. 6C, the i-th response signal may include the sequence number, a timestamp, identification information of the i-th PTT device, and sequence identification information for PTT message.

The sequence number of the i-th response signal indicates a sequence number of the corresponding heartbeat signal. Alternatively, the sequence number of the i-th response signal may be appropriately set by the i-th PTT device. However, it is preferred that the sequence number of the i-th response signal indicates the sequence number of the corresponding heartbeat signal.

The timestamp of the i-th response signal is, for example, a network time protocol (NTP) timestamp.

The identification information of the i-th PTT device is the identification information of the i-th PTT device that transmits the i-th response signal.

The sequence identification information for PTT message indicates the identification information of each segment of the first segment group of the PTT message received by the i-th PTT device. For example, when the PTT message S #1 and the PTT message S #2 are transmitted in step P110 and the i-th PTT device receives the PTT message S #1 and the PTT message S #2, the sequence identification information for PTT message may be set to "PTT S #1" and "PTT S #2."

Preferably, the i-th response signal is received from the i-th PTT device in the unicast manner.

Next, in step P140, based on the i-th response signal, the operation processor 150 allocates the i-th PTT device to either one of: a first group to which another part of the PTT message (a second segment group of the PTT message among the plurality of segments of the PTT message) is transmitted without any change or any conversion; and a second group to which the other part of the PTT message (the second segment group of the PTT message) is transmitted after being converted.

For example, when "i" is 1, the operation processor 150 allocates the PTT device 200-1 to one of the first group and the second group based on the first response signal. By performing step P140 while "i" is specified from 1 to 4, each of the PTT device 200-1, the PTT device 200-2, the PTT device 200-3, and the PTT device 200-4 is allocated to one of the first group and the second group.

The first group includes PTT devices to which the second segment group of the PTT message (e.g., the PTT message S #3 and the PTT message S #4 shown in FIG. 7) is transmitted without any change or any conversion. The number of the PTT devices belonging to the first group may be greater than or equal to 0 and less than or equal to n.

The second group includes PTT devices to which the second segment group of the PTT message (e.g., the PTT message S #3 and the PTT message S #4 shown in FIG. 7) cannot be transmitted without any change. Thus, the second segment group of the PTT message is converted first and then transmitted to the PTT devices in the second group. The number of the PTT devices in the second group may be greater than or equal to 0 and less than or equal to n.

FIG. 8 is a diagram specifically illustrating the operation of allocating the i-th PTT device to a group, which is performed by the operation processor 150 of the device 100 for transmitting the PTT message according to the first embodiment.

Referring to FIG. 8, step P140 includes step P145 in which the i-th PTT device is allocated to the first group if a response time is less than a predetermined threshold, and the i-th PTT device is allocated to the second group if the response time is greater than or equal to the predetermined threshold. The response time is the difference between the time at which the heartbeat signal is transmitted and the time at which the i-th response signal is received.

The predetermined threshold is set appropriately based on the bit rate of the PTT message (specifically, the bit rate of the video signal and the bit rate of the audio signal).

If the response time, which is the difference between the time at which the heartbeat signal is transmitted and the time at which the i-th response signal is received, is less than the predetermined threshold, it is determined that the bit rate of the PTT message is suitable for the current communication service quality (and the current status of the i-th PTT device) in the network group 400. Thus, the i-th PTT device is allocated to the first group. In this case, the second segment group of the PTT message (e.g., the PTT message S #3 and the PTT message S #4) is transmitted to the i-th PTT device (i.e., the first group) without any change or any conversion.

On the other hand, if the response time is equal to or greater than the predetermined threshold, it is determined that the bit rate of the PTT message is not suitable for the current communication service quality (and the current status of the i-th PTT device) in the network group 400. For example, when the communication service quality degrades or the status (condition) of the i-th PTT device deteriorates during the transmission of the PTT message, the i-th PTT device may not be able to process the PTT message normally if the original PTT message is transmitted thereto. Thus, the i-th PTT device is allocated to the second group. In this case, the second segment group of the PTT message (e.g., the PTT message S #3 and the PTT message S #4) is converted in step P180 to be described later, and the converted data (i.e., the data obtained by converting all or a part of the segments of the second segment group of the PTT message simultaneously or sequentially) is transmitted to the i-th PTT device (i.e., the second group).

Next, in step S150, the operation processor 150 transmits the second segment group of the PTT message to the first group through the communication interface 110, and transmits the converted data (i.e., the data obtained by converting all or a part of the segments of the second segment group of the PTT message simultaneously or sequentially) to the second group through the communication interface 110.

For example, referring to FIG. 7, the first group includes the PTT device 200-1, the PTT device 200-2, and the PTT device 200-4, and the second group includes the PTT device 200-3. The second segment group of the PTT message (e.g., the PTT message S #3 and the PTT message S #4) is transmitted to the first group (e.g., the PTT device 200-1, the PTT device 200-2, and the PTT device 200-4), and the data obtained by converting all or a part of the segments of the second segment group of the PTT message (e.g., the PTT message S #3 and the PTT message S #4) simultaneously or sequentially is transmitted to the second group (e.g., the PTT device 200-3).

The second segment group of the PTT message (e.g., the PTT message S #3 and the PTT message S #4) may be transmitted to the first group in the multicast manner or the unicast manner. Further, the data obtained by converting all or a part the segments of the second segment group of the PTT message may be transmitted to the second group (e.g., PTT device 200-3) simultaneously or sequentially in the multicast manner or the unicast manner.

Here, although FIG. 7 illustrates the example in which the second segment group of the PTT message is transmitted to the first group in the multicast manner and the data obtained by converting all or a part of the segments of the second segment group of the PTT message simultaneously or sequentially is transmitted to the second group in the unicast manner, the present embodiment is not limited thereto. For example, the data obtained by converting all or a part of the segments of the second segment group of the PTT message simultaneously or sequentially may also be transmitted to the second group in the multicast manner.

Meanwhile, as described above, the device 100 may further include the storage 130. In this case, the storage 130 stores identification information of each of the plurality of PTT devices included in the network group 400. Referring to FIG. 4, the operation processor 150 may, prior to step P110, designate one or more PTT devices, e.g., the first PTT device to the n-th PTT device, that are capable of receiving the PTT message among the plurality of PTT devices (step P160). Step P160 may be performed, for example, by receiving a user's input that selects a PTT device for transmitting the PTT message. Thus, the device 100 may directly transmit the PTT message to the first PTT device to the n-th PTT device without using the PTT server 300.

Preferably, referring to FIG. 4, the operation processor 150 reads, prior to step P110, identification information of each of the first PTT device to the n-th PTT device among multiple pieces of identification information of the plurality of PTT device stored in the storage 130 (step P170). By performing step P170, the device 100 is allowed to directly transmit the PTT message to each of the first PTT device to the n-th PTT device using the identification information of each of the first PTT device to the n-th PTT device, even without using the PTT server 300.

Meanwhile, referring to FIG. 5, the operation processor 150 may convert, prior to step S150, all or a part of the segments of the second segment group of the PTT message into the aforementioned data simultaneously or sequentially (that is, the data obtained by converting all or a part of the segments of the second segment group of the PTT message simultaneously or sequentially to have bit rate(s) suitable for the PTT device(s) in the second group) (step P180).

For example, it is assumed that each segment of the second segment group of the PTT message includes a video signal at a first bit rate and an audio signal at a second bit rate.

If the second segment group of the PTT message is transmitted to the second group without any conversion, the second segment group of the PTT message may not be processed normally depending on the quality of the communication service or the status (condition) of the PTT device in the second group.

Thus, in step P180, the second segment group of the PTT message is converted into data having video signals and audio signals having low bit rates, and the converted data is transmitted to the second group. The conversion of the data may be accomplished, for example, using transcoding.

For example, each segment of the data may include a video signal having a third bit rate lower than the first bit rate and an audio signal having a fourth bit rate lower than the second bit rate.

For example, in the case where each segment of the second segment group of the PTT message includes the video signal having the first bit rate, each segment of the converted data may include the video signal having the third bit rate that is lower than the first bit rate.

If the first bit rate is, for example, 9,200 kbps for DVDs, the third bit rate may be 16 kbps for video telephony.

Further, for example, in the case where each segment of the second segment group of the PTT message includes the audio signal having the second bit rate, each segment of the converted data may include the audio signal having the fourth bit rate that is lower than the second bit rate.

If the second bit rate is, for example, 1,536 kbps for DTS quality, the fourth bit rate may be 192 kbps for DAB quality.

Further, for example, in the case where each segment of the second segment group of the PTT message include both the video signal and the audio signal, each segment of the converted data may include not the video signal, but the audio signal. In other words, the converted data may include the audio signal alone.

Accordingly, by utilizing the data that lowers the bit rate of each segment of the second segment group of the PTT message, the data may be processed normally within the PTT devices of the second group even when the quality of the communication service or the status (condition) of the PTT devices in the second group is degraded.

Steps P120 to P150 may be performed one or more times during the transmission of the PTT message. For example, referring to FIG. 7, the present embodiment has been described based on the example in which the PTT message S #1 and the PTT message S #2 that are included in the first segment group of the PTT message are transmitted to the plurality of PTT devices through step P110; a heartbeat signal is transmitted to the plurality of PTT devices through step P120; the i-th response signal is received from the i-th PTT device through step P130; a group of the i-th PTT device is determined based on the i-th response signal through step P140; and then the PTT message S #3 and the PTT message S #4 that are included in the second segment group of the PTT message are transmitted to the first group and the second group through step P150.

However, step P120 to P150 may be similarly applied even in the case the segments of the first segment group of the PTT message are, for example, a PTT message S #7 and a PTT message S #8, and the segments of the second segment group of the PTT message are, for example, a PTT message S #9 and a PTT message S #10.

Therefore, according to the present embodiment, the suitable PTT message can be transmitted depending on the status of each of the plurality of PTT devices by allocating each of the plurality of PTT devices to one of the first group and the second group based on a response signal in real time or quasi-real time at least once during the transmission of the PTT message.

Further, although the present embodiment has been described based on the example in which the device 100 performs step P180, the present embodiment is not limited thereto. For example, the device 100 may transmit the second segment group of the PTT message to the PTT server 300, and the PTT server 300 that has a higher processing performance compared to the device 100 may convert the second segment group of the PTT message to the aforementioned data (i.e., the data obtained by converting each segment of the second segment group of the PTT message to have a bit rate suitable for the PTT devices) and transmit the converted data to the plurality of PTT devices.

Therefore, according to the first embodiment, it is possible to check, by using the heartbeat signal, the status of each of the plurality of PTT devices in real time without using a signal for quality measurement and a quality measurement server; the time required to check the status of each of the plurality of PTT devices can be minimized by collectively transmitting the heartbeat signal to the plurality of PTT devices; and the PTT service suitable for each of the plurality of PTT devices can be provided based on the measured status of each of the plurality of PTT devices even during the transmission of the PTT message. In addition, in the case where the identification information of each of the plurality of PTT devices is stored in the device 100 for transmitting the PTT message, the device 100 can provide the PTT service to each of the plurality of PTT devices even without using the PTT server 300.

Second Embodiment

The above-described first embodiment has been described based on the case where the configuration of the device 100 for transmitting the PTT message is substantially the same as the configuration of each of the plurality of PTT devices.

However, according to a second embodiment, the device 100 for transmitting the PTT message may also be provided as part of the functionality of the PTT server 300.

FIG. 9 is a diagram illustrating an example of the sequence of operations performed by the operation processor 150 of the device 100 for transmitting a PTT message according to the second embodiment. In the sequence of operations performed by the operation processor 150 of the device 100 for transmitting the PTT message according to the second embodiment of FIG. 9, the redundant descriptions of operations similar to the operations (e.g., step P110 to step P180) performed by the operation processor 150 according to the first embodiment shown in FIGS. 3 to 5 will be omitted.

According to the second embodiment, the operation processor 150 (i.e., the operation processor of the PTT server 300) not only performs steps P110 to P180, but also perform step P200 in which a PTT message is received from a publisher (not shown) of the PTT message (step P200).

In other words, the PTT server 300 includes the functions of the device 100 and receives the PTT message first through step P200.

Thereafter, the PTT server 300 performs steps P110 to P180 such that the PTT server 300 transmits the PTT message to the plurality of PTT devices.

Since the operations in steps P110 to P180 performed by the PTT server 300 of the second embodiment are substantially the same as the operations in steps P110 to P180 performed by the above-described operation processor 150 according to the first embodiment. Thus, a detailed description of the second embodiment will be omitted.

As described above, according to the second embodiment, it is possible to check, by using the heartbeat signal, the status of each of the plurality of PTT devices in real time without using a signal for quality measurement and a quality measurement server; the time required to check the status of each of the plurality of PTT devices can be minimized by collectively transmitting the heartbeat signal to the plurality of PTT devices; and the PTT service suitable for each of the plurality of PTT devices can be provided based on the measured status of each of the plurality of PTT devices even during the transmission of the PTT message.

Other Embodiments

While the technique of the present disclosure is described in detail by way of the embodiments described above, the technique of the present disclosure is not limited thereto and may be modified in various ways without departing from the scope thereof.

For example, the technique of the present disclosure may be applied to a method for transmitting a push-to-talk message.

The method for transmitting the push-to-talk message according to the technique of the present disclosure may include (a) transmitting a first segment group of the PTT message among multiple segments of the PTT message to a first PTT device to an n-th PTT device (where "n" is a natural number equal to or greater than 2) through the communication interface; (b) transmitting a heartbeat signal to the first PTT device to the n-th PTT device through the communication interface; (c) receiving an i-th response signal to the heartbeat signal from an i-th PTT device (where "i" is a natural number from 1 to n) through the communication interface; (d) allocating, based on the i-th response signal, the i-th PTT device to either a first group to which a second segment group of the PTT message among the multiple segments of the PTT message is transmitted without any conversion or a second group to which data obtained by converting all or a part of segments of the second segment group of the PTT message simultaneously or sequentially is transmitted; and (e) transmitting the second segment group of the PTT message to the first group through the communication interface and transmitting the data to the second group through the communication interface.

Other technical features of the device for transmitting the push-to-talk message according to the technique of the present disclosure may also be applied in a similar way to the method for transmitting the push-to-talk message according to the technique of the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

According to some embodiments of the technique of the present disclosure, it is possible to check, by using the heartbeat signal, the status of each of the plurality of PTT devices in real time without using a signal for quality measurement and a quality measurement server; the time required to check the status of each of the plurality of PTT devices can be minimized by collectively transmitting the heartbeat signal to the plurality of PTT devices; and the PTT service suitable for each of the plurality of PTT devices can be provided based on the measured status of each of the plurality of PTT devices even during the transmission of the PTT message. In addition, in the case where the identification information of each of the plurality of PTT devices is stored in the device for transmitting the PTT message, the device for transmitting the PTT message can provide the PTT service to each of the plurality of PTT devices even without using the PTT server.

What is claimed is:

1. A device for transmitting a push-to-talk (PTT) message, the device comprising:
   a communication interface; and
   an operation processor configured to:
   (a) transmit a first segment group of the PTT message among multiple segments of the PTT message to a first PTT device to an n-th PTT device (where "n" is a natural number equal to or greater than 2) through the communication interface;
   (b) transmit a heartbeat signal to the first PTT device to the n-th PTT device through the communication interface;
   (c) receive an i-th response signal to the heartbeat signal from an i-th PTT device (where "i" is a natural number from 1 to n) through the communication interface;
   (d) allocate, based on the i-th response signal, the i-th PTT device to either one of: a first group to which a second segment group of the PTT message among the multiple segments of the PTT message is transmitted without any conversion; and a second group to which data obtained by converting all segments of the second segment group of the PTT message is transmitted; and
   (e) transmit the second segment group of the PTT message to the first group through the communication interface and transmit the data to the second group through the communication interface.

2. The device of claim 1, further comprising:
   a storage configured to store identification information of each of the plurality of PTT devices including the first PTT device to the n-th PTT device,
   wherein the operation processor is further configured to
   (f) designate the first PTT device to the n-th PTT device among the plurality of PTT devices.

3. The device of claim 1, further comprising:
   a storage configured to store identification information of each of the plurality of PTT devices including the first PTT device to the n-th PTT device,
   wherein the operation processor is further configured to
   (g) read identification information of each of the first PTT device to the n-th PTT device among multiple pieces of identification information of the plurality of PTT devices stored in the storage.

4. The device of claim 1, wherein the operation processor is further configured to
   (h) convert all the segments of the second segment group of the PTT message into the data before performing (e).

5. The device of claim 1, wherein the operation processor is further configured to
   (i) receive the PTT message from a publisher of the PTT message.

6. The device of claim 1, wherein each segment of the second segment group of the PTT message includes a video signal at a first bit rate and an audio signal at a second bit rate, and
   each segment of the data includes a video signal at a third bit rate lower than the first bit rate and an audio signal at a fourth bit rate lower than the second bit rate.

7. The device of claim 1, wherein each segment of the second segment group of the PTT message includes a video signal at a first bit rate, and
   each segment of the data includes a video signal at a third bit rate lower than the first bit rate.

8. The device of claim 1, wherein each segment of the second segment group of the PTT message includes an audio signal at a second bit rate, and
   each segment of the data includes an audio signal at a fourth bit rate lower than the second bit rate.

9. The device of claim 1, wherein each segment of the second segment group of the PTT message includes a video signal and an audio signal, and
   each segment of the data includes the audio signal.

10. The device of claim 1, wherein at least one of the first segment group of the PTT message, the heartbeat signal, the second segment group of the PTT message or the data is transmitted in a multicast manner.

11. The device of claim 1, wherein the data is transmitted in a unicast manner.

12. The device of claim 1, wherein the i-th response signal is received in a unicast manner.

13. The device of claim 1, wherein the heartbeat signal includes a sequence number and identification information of each segment of the first segment group of the PTT message.

14. The device of claim 1, wherein the i-th response signal includes a sequence number and identification information of the i-th PTT device.

15. The device of claim 14, wherein the i-th response signal further includes whether or not information is received for each segment of the first segment group of the PTT message.

16. The device of claim 1, wherein, in (d), the i-th PTT device is allocated to the first group if a response time, which is a difference between a time at which the heartbeat signal is transmitted and a time at which the i-th response signal is received, is less than a predetermined threshold, and the i-th PTT device is allocated to the second group if the response time is greater than or equal to the predetermined threshold.

* * * * *